(12) United States Patent
Nakada et al.

(10) Patent No.: US 10,646,004 B2
(45) Date of Patent: May 12, 2020

(54) METHODS FOR MANUFACTURING HOOK FASTENER

(71) Applicant: YKK Corporation, Tokyo (JP)

(72) Inventors: Satoshi Nakada, Kurobe (JP); Chieko Arai, Kurobe (JP); Ryosuke Tanimoto, Kurobe (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/990,901

(22) Filed: May 29, 2018

(65) Prior Publication Data

US 2018/0271228 A1 Sep. 27, 2018

Related U.S. Application Data

(62) Division of application No. 15/280,918, filed on Sep. 29, 2016, now Pat. No. 10,016,022.

(60) Provisional application No. 62/238,350, filed on Oct. 7, 2015.

(51) Int. Cl.
*A44B 18/00* (2006.01)
*B29C 43/02* (2006.01)
*B29C 43/52* (2006.01)
*B29L 31/00* (2006.01)

(52) U.S. Cl.
CPC ...... *A44B 18/0065* (2013.01); *A44B 18/0049* (2013.01); *B29C 43/02* (2013.01); *B29C 43/52* (2013.01); *B29L 2031/729* (2013.01)

(58) Field of Classification Search
CPC . A44B 18/0065; A44B 18/0049; B29C 43/52; B29C 43/02; B29L 2031/729
See application file for complete search history.

(56) References Cited

U.S. PATENT DOCUMENTS

| 4,846,815 | A | * | 7/1989 | Scripps | A44B 18/0019 604/391 |
|---|---|---|---|---|---|
| 5,505,747 | A | * | 4/1996 | Chesley | A44B 18/0049 156/245 |
| 5,679,302 | A | * | 10/1997 | Miller | A44B 18/0049 264/167 |
| 5,743,800 | A | * | 4/1998 | Huard | A63F 3/00157 463/26 |
| 5,749,129 | A | * | 5/1998 | Murasaki | A44B 18/0049 24/442 |

(Continued)

FOREIGN PATENT DOCUMENTS

KR 2012-0018322 A 3/2012

OTHER PUBLICATIONS

Office Action, Korean Patent Application No. 10-2016-0128878, dated Nov. 21, 2017.

(Continued)

*Primary Examiner* — Jeffrey M Wollschlager
(74) *Attorney, Agent, or Firm* — Kilpatrick Townsend & Stockton LLP (57) ABSTRACT

A hook fastener includes a stem having two lateral edges, a first surface, and a second surface. A cap extends from an upper end of the stem, and the cap includes an upper surface, a first end, a second end, and a pair of overhanging portions. The upper surface of the cap is sloped between the first end and the second end. The first and second ends are at opposite longitudinal ends of the cap, and each overhanging portion extends in a lateral direction from the stem.

5 Claims, 8 Drawing Sheets

(56) References Cited

U.S. PATENT DOCUMENTS

| | | | |
|---|---|---|---|
| 5,755,015 A * | 5/1998 | Akeno | A44B 18/0049 24/452 |
| 5,845,375 A * | 12/1998 | Miller | A41D 13/1161 24/452 |
| 5,868,987 A * | 2/1999 | Kampfer | A44B 18/0061 264/280 |
| 5,884,374 A * | 3/1999 | Clune | A44B 18/0049 24/446 |
| 5,887,320 A * | 3/1999 | Provost | A44B 18/0049 24/442 |
| 6,054,091 A | 4/2000 | Miller et al. | |
| 6,132,660 A * | 10/2000 | Kampfer | A44B 18/0049 264/167 |
| 6,303,062 B1 * | 10/2001 | Aamodt | A44B 18/0049 264/167 |
| 6,540,497 B1 * | 4/2003 | Fuda | A44B 18/0049 425/174.2 |
| 6,588,073 B1 * | 7/2003 | Zoromski | A44B 18/0015 24/446 |
| 6,592,800 B1 * | 7/2003 | Levitt | A44B 18/0049 264/167 |
| 6,627,133 B1 | 9/2003 | Tuma | |
| 6,678,924 B2 | 1/2004 | Murasaki et al. | |
| 6,687,962 B2 * | 2/2004 | Clarner | A44B 18/0053 24/442 |
| 6,746,434 B2 * | 6/2004 | Johnson | A61F 13/82 2/912 |
| 6,884,157 B2 * | 4/2005 | Chesley | A44B 18/00 428/106 |
| 6,991,843 B2 * | 1/2006 | Armela | A44B 18/0049 428/120 |
| 7,052,638 B2 | 5/2006 | Clarner et al. | |
| 7,275,290 B2 * | 10/2007 | Clarner | A44B 18/0061 24/452 |
| 7,350,276 B2 | 4/2008 | Minato et al. | |
| 8,819,902 B2 | 9/2014 | Tuma | |
| 8,935,836 B2 | 1/2015 | Picot et al. | |
| 8,961,850 B2 | 2/2015 | Wood et al. | |
| 2002/0069495 A1 * | 6/2002 | Murasaki | A44B 18/0053 24/442 |
| 2002/0124359 A1 * | 9/2002 | Murasaki | A44B 18/0049 24/452 |
| 2003/0131453 A1 * | 7/2003 | Clarner | A44B 18/0053 24/452 |
| 2004/0134045 A1 | 7/2004 | Poulakis et al. | |
| 2010/0180407 A1 * | 7/2010 | Rocha | B29C 59/04 24/452 |
| 2010/0306969 A1 | 12/2010 | Seifert | |
| 2012/0047695 A1 * | 3/2012 | Picot | A44B 18/0065 24/449 |
| 2012/0151720 A1 * | 6/2012 | Hanschen | A44B 18/0065 24/444 |
| 2014/0237779 A1 | 8/2014 | Gallant et al. | |
| 2014/0350507 A1 | 11/2014 | Pariseau et al. | |
| 2015/0074956 A1 | 3/2015 | Marche et al. | |
| 2015/0272790 A1 | 10/2015 | Fujisaki et al. | |
| 2017/0099915 A1 | 4/2017 | Nakada et al. | |

OTHER PUBLICATIONS

*Restriction Requirement, U.S. Appl. No. 15/280,918, dated Aug. 25, 2017.

*Non-Final Office Action, U.S. Appl. No. 15/280,918, dated Oct. 26, 2017.

*Notice of Allowance, U.S. Appl. No. 15/280,918, dated Aug. 25, 2017.

* cited by examiner

METHODS FOR MANUFACTURING HOOK FASTENER

CROSS REFERENCE TO RELATED APPLICATIONS

This application is a divisional application of U.S. patent application Ser. No. 15/280,918 ("the '918 application"), filed Sep. 29, 2016, entitled Hook Fastener and Method for Manufacturing Same, which is related to and claims the benefit of U.S. Provisional Application Ser. No. 62/238,350 ("the '350 application"), filed on Oct. 7, 2015, entitled Hook Fastener and Method for Manufacturing Same. The '918 and '350 applications are hereby incorporated in their entirety by this reference.

FIELD OF THE INVENTION

This invention relates to hook fasteners for hook and loop attachment devices and for increasing insertability and increasing the forces required for disengaging hook and loop attachment devices.

BACKGROUND

Hook and loop attachment devices are utilized for a wide variety of products including, for example, clothing, shoes, diapers (for both children and adults), luggage, and throughout the automotive and aerospace industries. The design of hook and loop attachment devices for some products may include inefficiencies or inadequate attachment strength that leads to unintended disengagement.

In certain situations, it may be desirable to design hook and loop attachment devices to maximize strength and perceived strength when using and/or disengaging the hook and loop attachment devices.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Versions of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, a hook fastener comprises: a stem comprising two lateral edges, a first surface, and a second surface, the stem extending from a base surface; a cap that extends from an upper end of the stem, the cap comprising: an upper surface, a first end, a second end, and a pair of overhanging portions, wherein: the upper surface of the cap is sloped between the first end and the second end; the first and second ends are at opposite longitudinal ends of the cap; and each overhanging portion of the pair of overhanging portions extends in a lateral direction from the stem.

According to certain examples, a hook fastener comprises: a stem comprising two lateral edges, the stem extending from a base surface; a cap that extends from an upper end of the stem, the cap comprising: an upper surface, a first end, a second end, a first overhanging portion, and a second overhanging portion; and a cavity on an underside of the second end of the cap near an interface between the cap and the stem, the cavity penetrating a surface of the hook fastener, wherein the first and second ends are at opposite longitudinal ends of the cap and the first and second overhanging portions extend in opposite lateral directions from the stem.

According to certain examples, a method of manufacturing hook fasteners comprises: forming an intermediate component of a hook fastener where a longitudinal axis of a deforming portion of the intermediate component is tilted at an angle that is approximately 10°-15° from a vertical axis; passing the intermediate component between a first roller and a second roller; and deforming the deforming portion of the intermediate component to form a cap, wherein the cap comprises: an upper surface, a first end, a second end, and at least one overhanging portion, wherein: the upper surface of the cap is sloped between the first end and the second end; the first and second ends are at opposite longitudinal ends of the cap; and the at least one overhanging portion extends in a lateral direction from the cap.

BRIEF DESCRIPTION OF THE DRAWINGS

Illustrative embodiments of the present disclosure are described in detail below with reference to the following drawing figures.

DETAILED DESCRIPTION

The subject matter of versions of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-12 depict examples of hook fasteners 100 that are configured to engage a loop or a loop attachment structure. For example, FIG. 8A shows a top view of a hook fastener 100 engaged with a loop attachment structure 50. As described below, the geometric features of the hook fastener 100 may be adapted to affect one or more characteristics of the engagement of the hook fastener 100 with the loop attachment structure, such as, but not limited to, ease of attachment, attachment strength, or any other relevant attribute, or otherwise facilitate engagement of the hook fastener 100 with the loop attachment structure.

Figure 1:
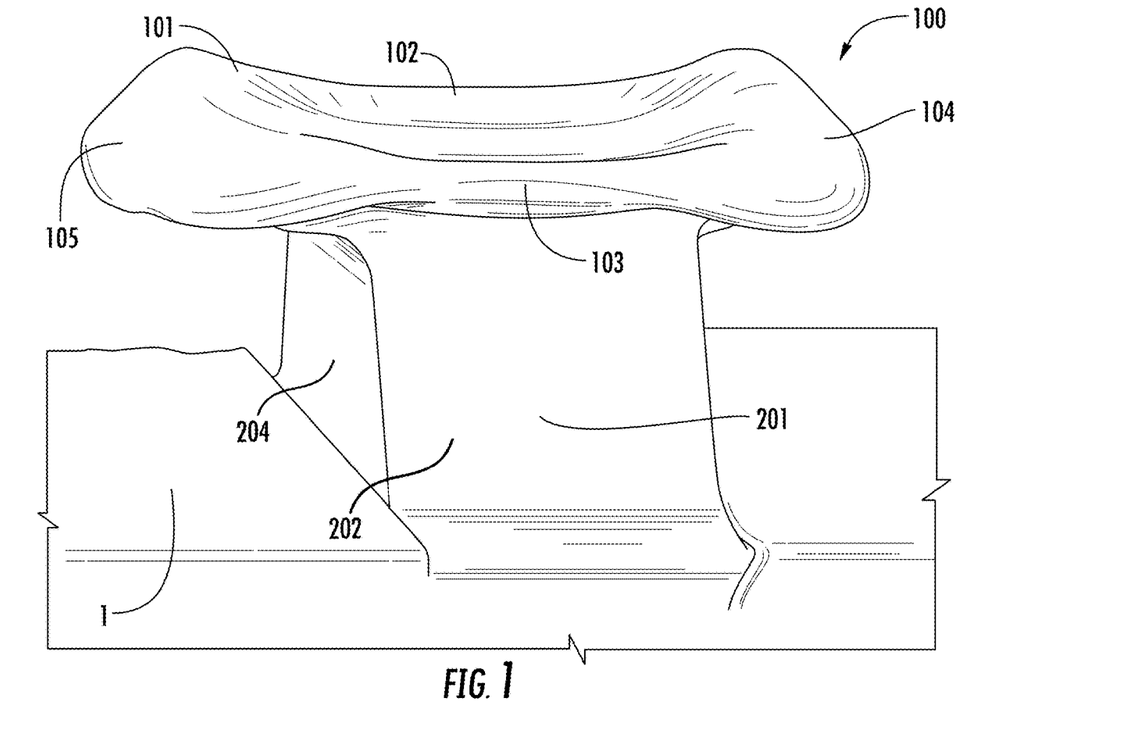
FIG. 1 is a perspective front view of a hook fastener according to certain aspects.
Figure 2:
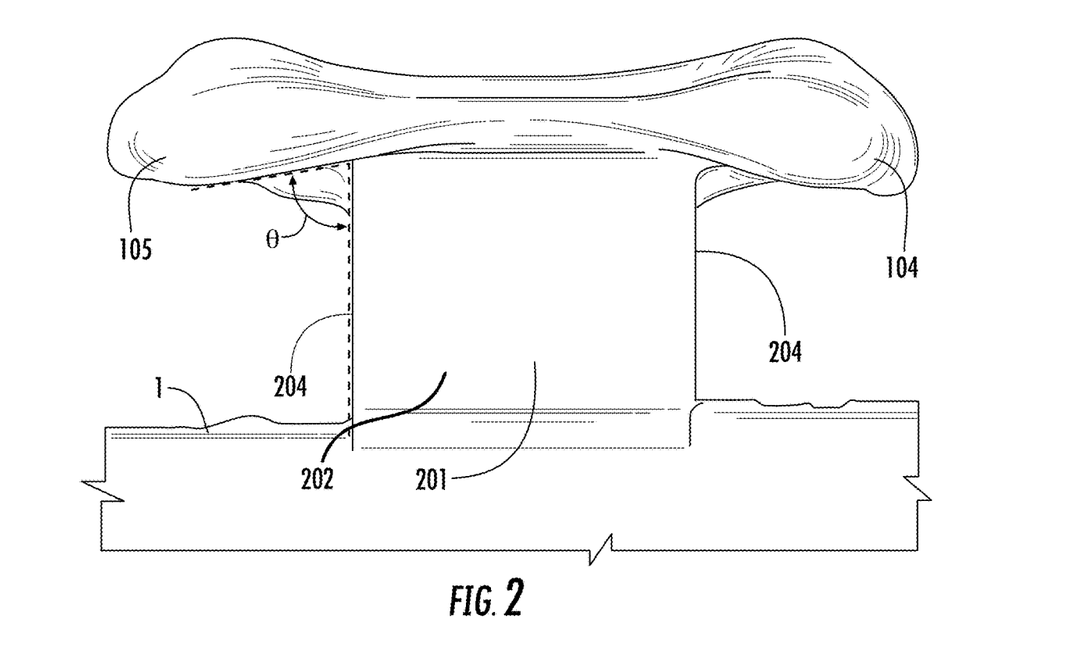
FIG. 2 is a front view of the hook fastener of FIG. 1.

As shown in FIG. 1, hook fastener 100 includes a cap 101 that extends from an upper part of a stem 201, the stem 201 extending from a base surface 1. As shown in FIGS. 1-6, the cap 101 includes a first end 102, a second end 103, and two or more overhanging portions. As shown in FIGS. 1 and 2, the two or more overhanging portions may include a first overhanging portion 104 and a second overhanging portion 105. In some cases, the first end 102 corresponds to a rear machine direction and the second end 103 corresponds to a front machine direction, where the front machine direction is a direction in which a product is transported during a manufacturing process and the rear machine direction is a direction opposite to the direction in which the product is transported during the manufacturing process.

Figure 3:
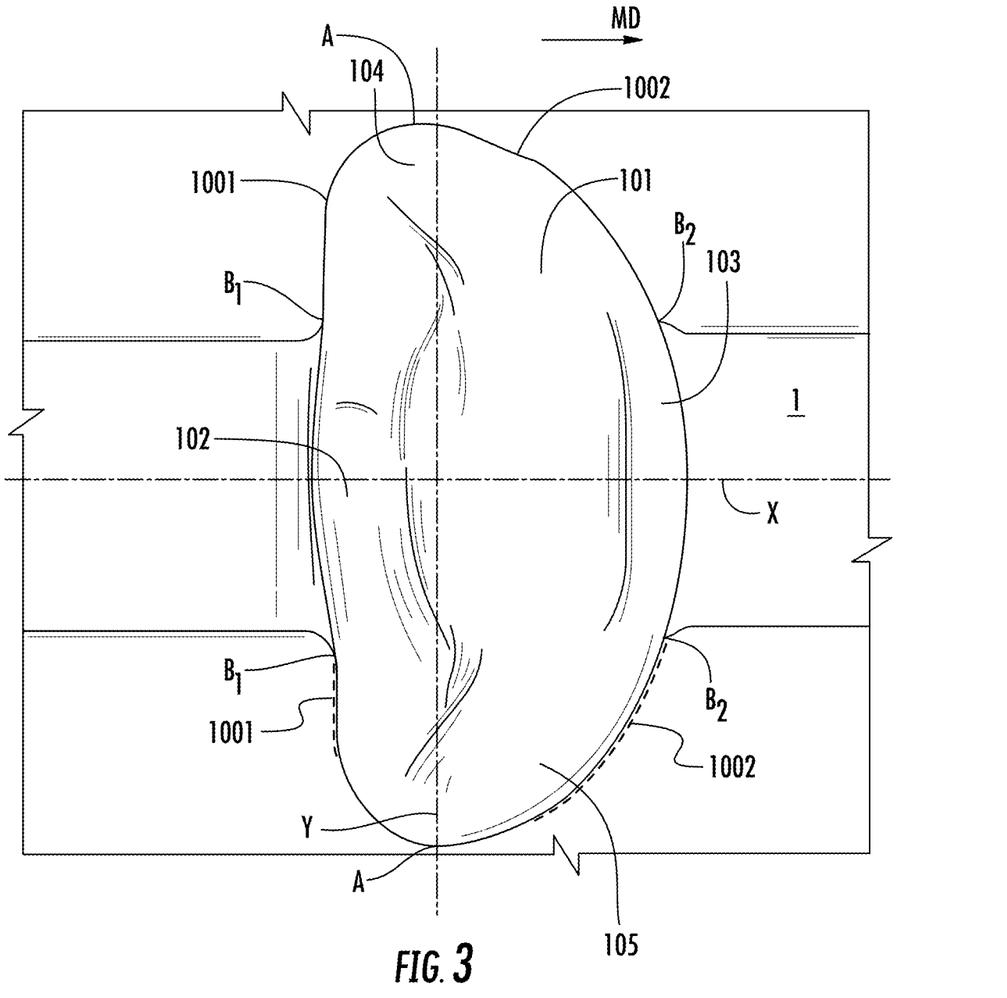
FIG. 3 is a top view of the hook fastener of FIG. 1.

As shown in FIG. 3, the first end 102 and the second end 103 may be positioned at opposite longitudinal ends of the hook fastener 100 (i.e., along the X-axis). In some examples, the first end 102 extends a full width of the cap 101 and thus includes parts of the first and second overhanging portions 104 and 105 that extend in the rear machine direction. In some examples, the second end 103 extends a full width of the cap 101 and thus includes parts of the first and second overhanging portions 104 and 105 that extend in the front machine direction.

Figure 8A:
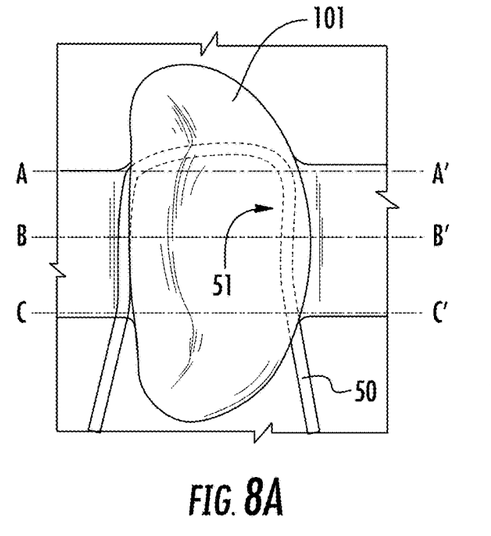
FIG. 8A is a top view of the hook fastener of FIG. 1, shown engaged with a loop.

The overhanging portions 104 and 105 may extend in one or more directions including, for example, the X and/or Y axes shown in FIG. 3. In some examples, the X-axis is approximately parallel to the machine direction (MD). The Y-axis direction extends along a cross machine direction (CD). In the illustrated example, the overhanging portions 104 and 105 extend from the stem 201 in lateral directions that are approximately parallel to the Y-axis. As illustrated, the cap 101 may be distorted and configured so portions of the cap 101 adjacent to the first end 102 are curled and/or everted. In some cases, the cap 101 being curled and/or everted creates an open region under the overhanging portions 104 and 105 where a loop attachment structure 50 may engage the hook fastener 100 as shown in FIG. 8A.

With reference to FIG. 2, the overhanging portions 104 and 105 may extend down toward base surface 1 such that angle θ is approximately 90°, where angle θ is an angle between a line approximately parallel to the underside of overhanging portion 104 (or 105) and the side surface of stem 201. As illustrated, the side surface of stem 201 may be approximately vertical. To ensure that loop attachment structures, such as loop attachment structures 50, can adequately disengage from the hook fastener 100, the overhanging portions 104 and 105 only extend a specified distance toward base surface 1 (i.e., angle θ may be acute but not significantly less than) 90°. For example, in some cases, angle θ is between approximately 60° and 120°. In some examples, angle θ is approximately 80°.

Figure 6:
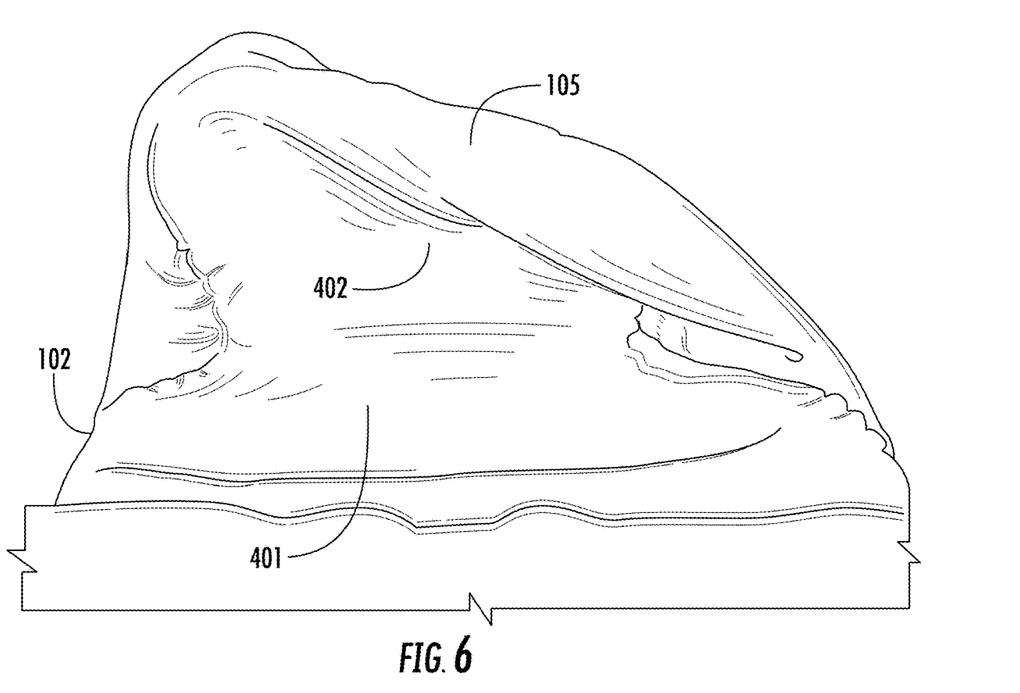
FIG. 6 is a perspective bottom side view of the hook fastener of FIG. 1.

The overhanging portion 105 may include one or more generally flat portions 401 on its underside surface, as shown for example in FIG. 6. Similarly, the overhanging portion 104 may include one or more generally flat portions 401. In some cases, the generally flat portions 401 are approximately parallel to the base surface 1. In some cases, as shown in FIG. 6, the underside surface of one or both of the overhanging portions 104 and 105 may also include a concave portion 402. The concave portion 402 may function as a cavity for securing loop attachment structure 50 and thus increasing peel strength.

As shown in FIG. 2, in some cases one or both of the overhanging portions 104 and 105 are thicker in the vertical direction than a central portion of the cap 101 (i.e., the portion of the cap 101 above the stem 201).

Figure 4:
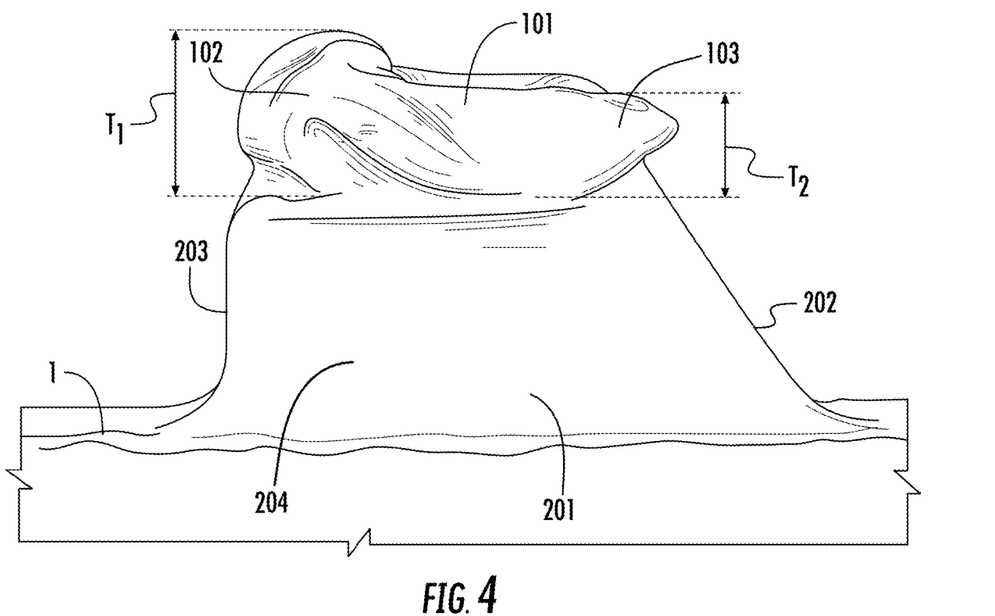
FIG. 4 is a side view of the hook fastener of FIG. 1.

In some cases, at least a portion of the first end 102 is thicker and has a greater height than at least a portion of the second end 103. For example, as shown in FIG. 4, the first end 102 may include a thickness (extending generally perpendicular to base surface 1) $T_1$ while the second end 103 may include a thickness (extending generally perpendicular to base surface 1) $T_2$ that is less than $T_1$. In particular, the first end 102, which encompasses parts of the overhanging portions 104 and 105, may have the thickness $T_1$, whereas the second end 103, which encompasses parts of the overhanging portions 104 and 105, may have the thickness $T_2$. The thinner and/or lower portion of the second end 103 enables the loop attachment structure 50 to easily be inserted onto the hook fastener 100. The thicker and/or taller portion of the first end 102 increases stiffness of the first end 102 and therefore increases peel strength after the loop attachment structure 50 is inserted, as the thick area increases forces required for elastic deformation of the cap 101 while the thinner/lower portion prevents a reduction in the ability to insert the loop attachment structure 50 onto the hook fastener 100. In addition, the everted, contoured outer surface of the cap 101 increases peel strength.

Figure 11:
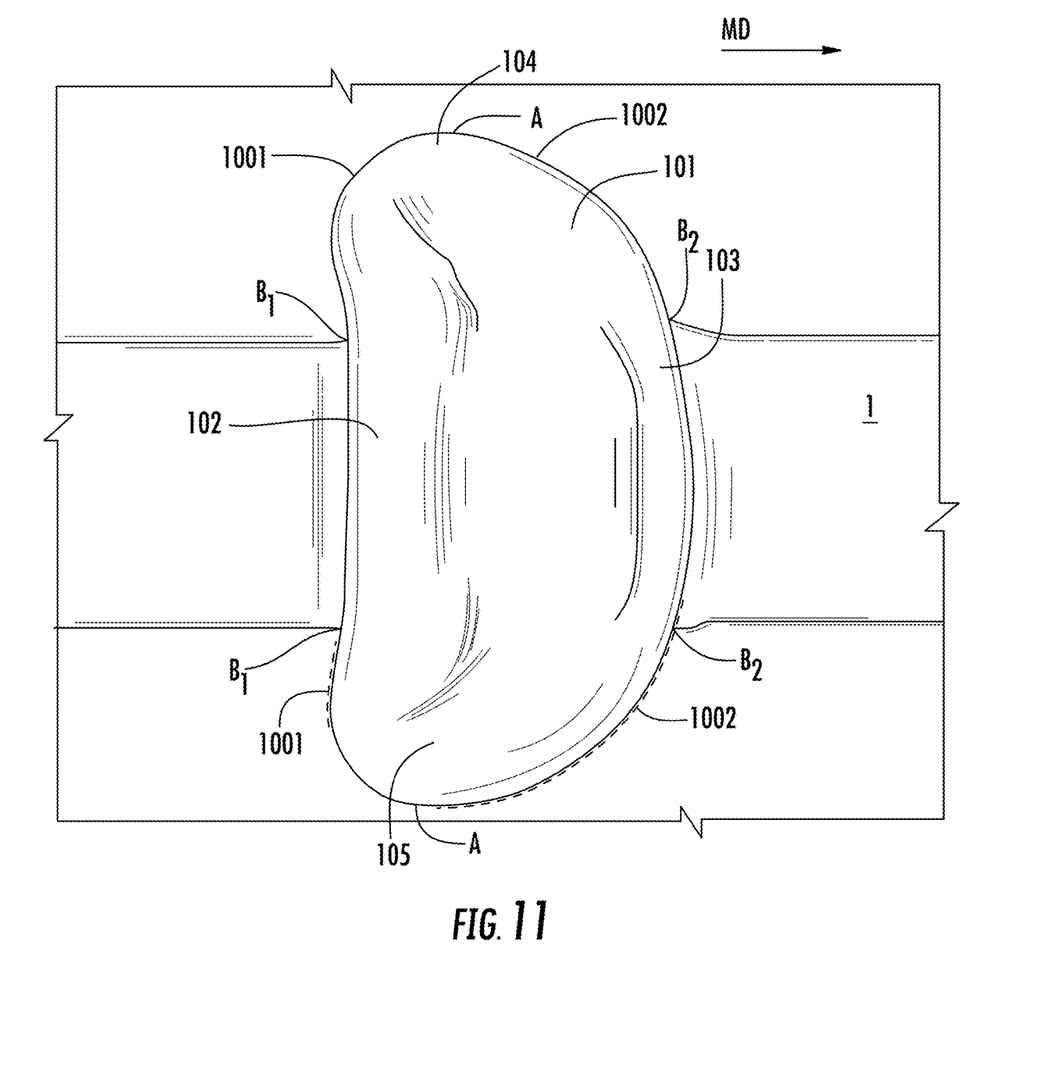
FIG. 11 is a top view of a hook fastener according to certain aspects.

As illustrated in FIGS. 3 and 11, in some cases the cap 101 is generally symmetric about the X-axis, but not symmetric about the Y-axis. As shown in FIG. 4, at least a portion of the length of the stem 201 is greater than the length of the cap 101 (along the X-axis), while, as shown in FIG. 2, the width of the cap 101 is greater than the width of the stem 201 (along the Y-axis). This is because the first and second overhanging portions 104 and 105 have sufficient widths (along the Y-axis) to engage with the corresponding loop attachment structure 50. As shown in FIG. 3, the first and second overhanging portions 104 and 105 have sufficient lengths (along the X-axis) to engage with the corresponding loop attachment structure 50.

As shown in FIG. 4, the stem 201 may include a sloped surface 202, which increases in dimension along the X-axis of the stem 201 when moving toward the base surface 1. There may be an approximately vertical surface 203 opposite the sloped surface 202 with side surfaces 204 extending between the sloped surface 202 and the approximately vertical surface 203, as shown in FIGS. 1, 2, and 4. In some cases, the angle of the sloped surface 202 relative to the base surface 1 is greater than the angle of the approximately vertical surface 203 relative to the base surface 1. In other examples, the surface 203 may be a second sloped surface which increases a dimension of the stem 201 (along the X-axis) when moving toward the base surface 1. In such examples, the angle of the second sloped surface relative to the base surface 1 is less than the angle of the sloped surface 202.

Figure 5:
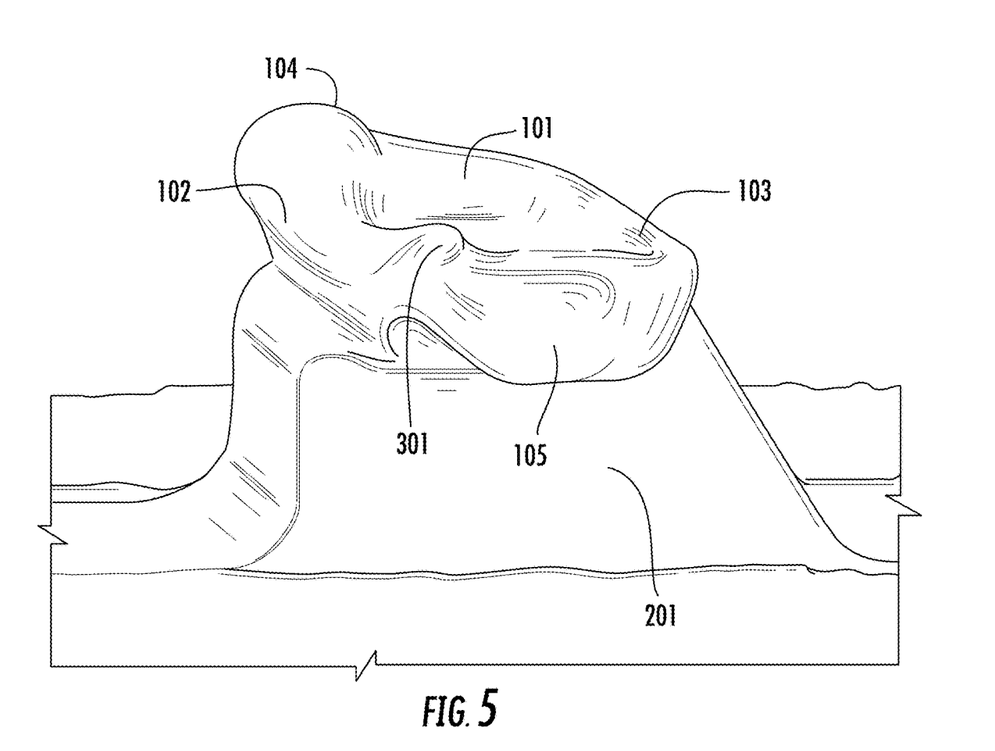
FIG. 5 is a perspective top side view of the hook fastener of FIG. 1.

As shown in FIG. 5, the cap 101 may include one or more protrusions 301. In some cases, the one or more protrusions 301 define a maximum thickness (see $T_1$ in FIG. 4), which is greater than a thickness of other portions of the cap 101 (see $T_2$ in FIG. 4). The one or more protrusions 301 may be a local peak in the contoured upper surface of the cap 101.

Figure 7:
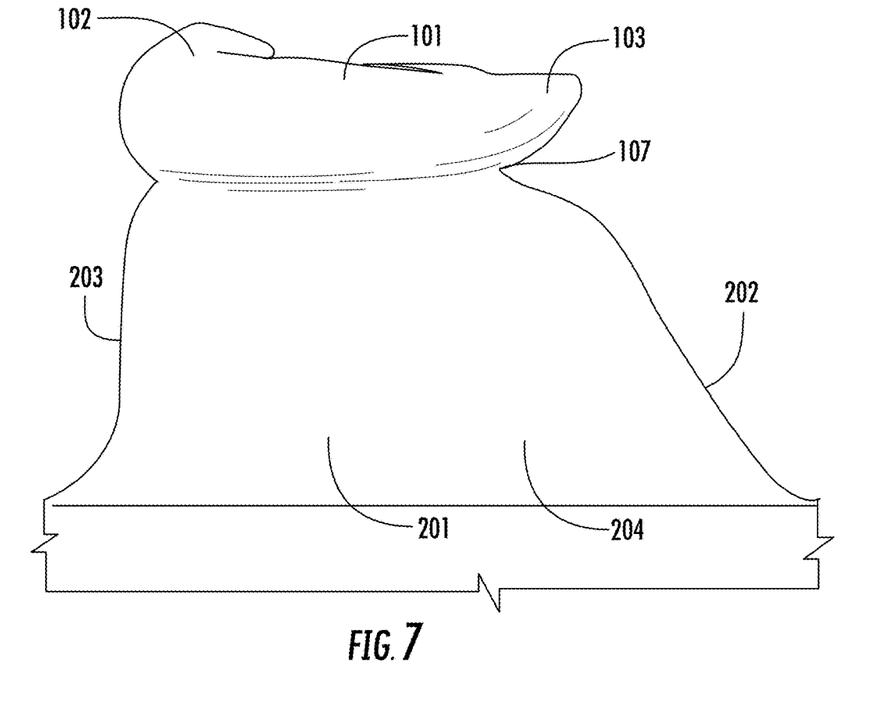
FIG. 7 is a side view of the hook fastener of FIG. 1.

As illustrated in FIG. 4, the upper surface of the cap 101 is sloped between the first end 102 and the second end 103 such that the first end 102 is elevated higher than the second end 103 relative to the base surface 1. As a result of this sloped upper surface, the loop attachment structure 50 (see FIG. 8A), when interfacing with hook fastener 100, will slide toward second end 103 of the cap 101 to facilitate insertion of the loop attachment structure 50 from the second end 103. In some examples, this surface may slope uniformly and smoothly. In some cases, this surface may be an irregular surface. After the loop attachment structure 50 reaches the second end 103, the loop attachment structure 50 will engage the second end 103 for a secure attachment. Specifically, in some cases, the loop attachment structure 50 is received within a cavity 107 adjacent to an interface between the cap 101 and the stem 201 at an underside of the second end 103, as shown in FIG. 7. For example, a portion 51 of the loop attachment structure 50 (FIG. 8A) is received within the cavity 107. In some cases, cavity 107 is shaped and dimensioned to snuggly receive and secure the loop attachment structure 50. In some examples, the hook fastener 100 includes another cavity adjacent to an interface between the cap 101 and the stem 201 at an underside of the first end 102. The loop attachment structure 50 may be engageably received in the cavity at the first end 102. In some examples, the loop attachment structure 50 is not received in the cavity at the first end 102.

Figure 8B:
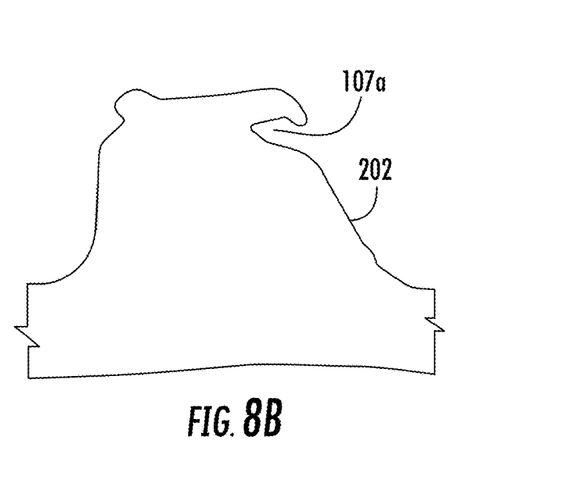
FIGS. 8B, 8C, and 8D are cross sectional views of the hook fastener of FIG. 8A.
Figure 8C:
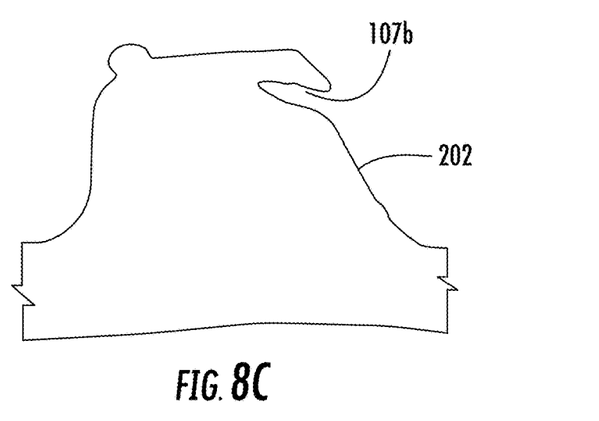
Figure 8D:
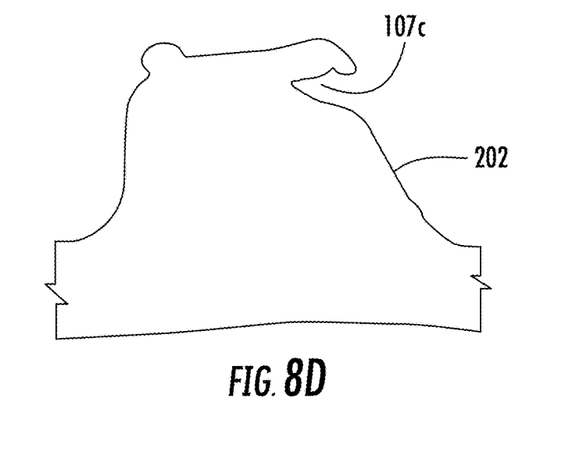

As shown in the cross-sectional views in FIGS. 8B-8D, the cavity 107 may be an open area forming an acute angle at an interior-most point in a region between the cap 101 and the stem 201. As shown in FIGS. 7 and 8B-8D, the cavity 107 extends toward the first end 102 of the cap 101 such that a channel penetrates the surface of the hook fastener 100, where the channel is shaped and sized to receive the loop attachment structure 50. In some cases, a portion of the second end 103 of the cap 101 is cantilevered and extends over the cavity 107. While the slope or angle of the sloped surface 202 is approximately constant, the slope of the interior surface of the cavity 107 is different from the slope of sloped surface 202.

FIG. 8B shows a cross sectional view along line A-A' of FIG. 8A, FIG. 8C shows a cross sectional view along line B-B' of FIG. 8A, and FIG. 8D shows a cross sectional view along line C-C' of FIG. 8A. In some cases, as shown in FIGS. 7 and 8B-8D, the cavity 107 may include a wedge-shaped region that changes along the width of the hook fastener 100 (i.e., the Y-axis shown in FIG. 3). For example, the shape of the cavity 107 near the center of the hook fastener 100 (see 107b in FIG. 8C) has a smaller opening compared to the shape of the cavity 107 closer to the lateral edges of the hook fastener 100 (see 107a in FIG. 8B and 107c from FIG. 8D). The smaller opening for cavity 107b decreases the likelihood of inadvertent disengagement of the loop attachment structure 50 from the hook fastener 100. Furthermore, due to the narrowed opening for 107b and because the loop attachment structure 50 wedges into the cavity 107, engagement strength between the loop attachment structure 50 and the hook fastener 100 is increased. In addition, because of the shape of sloped surface 202 of the stem 201, when loop attachment structure 50 interfaces with the hook fastener 100, the loop attachment structure 50 is guided along the sloped surface 202 to the cavity 107. Therefore, the engagement rate of loop attachment structures 50 attaching to the hook fasteners 100 increases. In some examples, the angle of the sloped surface 202 of the stem 201 (relative to base surface 1) is within a range from 50° to 80° to facilitate movement of the loop attachment structure 50 along the sloped surface 202 into the cavity 107.

A plan view of the second end 103 (see FIG. 3) illustrates that the second end 103 is optimized to attach to the loop attachment structure 50 because the second end 103 includes a curved edge that has a greater radius of curvature than the opposite edge of the first end 102. In some cases, as shown in FIG. 3, the outer edges of the cap 101 may include a first periphery edge 1001 that is different than the second periphery edge 1002. Each of the first and second overhanging portions 104 and 105 may include a tip end portion A arranged at an outermost point distal from the stem 201 in the cross machine direction (CD), a first periphery edge 1001 at the first end 102 with respect to the tip end portion A, and a second periphery edge 1002 at the second end 103 with respect to the tip end portion A. The first periphery edge 1001 may extend from point $B_1$ to the tip end portion A and the second periphery edge 1002 may extend from point $B_2$ to tip end portion A. Point $B_1$ is a location on the first periphery edge 1001 that is generally aligned with a side surface 204 of the stem 201. Point $B_2$ is a location on the second periphery edge 1002 that is generally aligned with a side surface 204 of the stem 201.

If the first and second overhanging portions 104 and 105 are divided by a line passing through each tip end portion A (such that the line is approximately parallel to the Y-axis) to separate each of the overhanging portions 104, 105 into a first area of the first end of the cap and a second area of the second end of the cap, the first area is smaller than the second area (when viewed from above). The length of first periphery edge 1001 may be less than the length of the second periphery edge 1002. The radius of curvature for at least a portion of the first periphery edge 1001 may be smaller than the radius of curvature for the second periphery edge 1002. In some cases, when viewed from above, the first periphery edge 1001 is generally straight/linear from the point $B_1$ and extends laterally and approximately parallel to the Y-axis (FIG. 3) or curves at least partially in a direction opposite of second end 103 and away from the cap 101 (FIG. 11). When viewed from above, the second periphery edge 1002 is gently curved from the point $B_2$ to the tip end portion A. Because the tip end portion A of each overhanging portion 104, 105 is closer to the first end 102 compared to the second end 103 and the radius of curvature for a portion of the first periphery edge 1001, which extends from the point $B_1$ toward the tip end portion A, is smaller than the radius of curvature for the second periphery edge 1002, peel strength (engagement) may be increased. Disengagement of loop attachment structure 50 from the second periphery edge 1002 may be easier than disengagement from the first periphery edge 1001, but the longer length of second periphery edge 1002 prevents disengagement.

In some cases, the shape of the cap 101 is configured to be more comfortable against a user's skin (e.g., a hand or an abdominal area) as the top surface is inclined and rounded, and the sides surface are also curled and rounded.

FIG. 11 shows another example of a hook fastener 100 with a different shaped cap 101. Although some of the same reference numbers are used for both the hook fastener of FIGS. 1-6 and the hook fastener of FIG. 11, the two sets of Figures are not meant to depict the same hook fastener. Furthermore, in some cases, individual features from the two hook fasteners may be combined and/or substituted. In some examples, as shown in FIG. 11, the first periphery edge 1001 extends away from the point B₁ at the first end 102 curving in a direction that is at least partially in a direction opposite from the second end 103 and the second periphery edge 1002 extends away from the point B₂ at the second end 103 curving toward the first end 102 over the entire length of the second periphery edge 1002, when viewed from above.

Figures 9A, 9B:
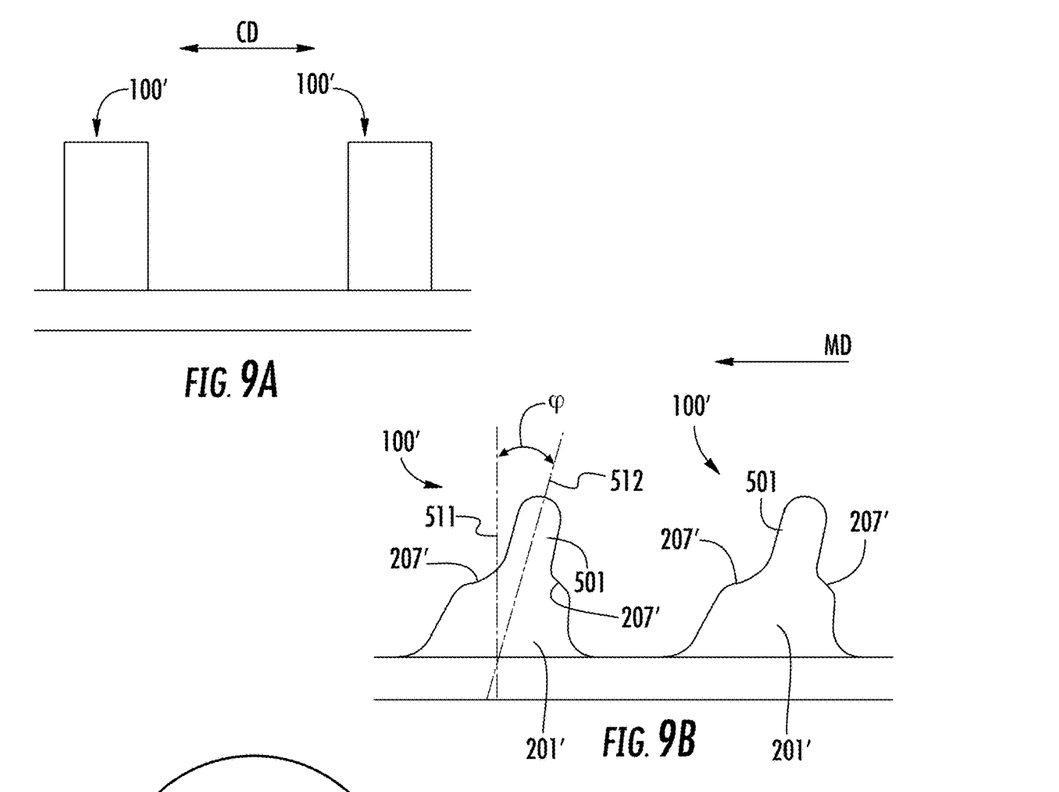
FIG. 9A is a front view of an intermediate state of the hook fastener of FIG. 1.
FIG. 9B is a side view of an intermediate state of the hook fastener of FIG. 1.

In one exemplary method, hook fasteners 100 are formed from a two-step continuous, injection molding process that includes rolling and applying heat. In one example, a first step is to form hook fasteners 100 into an intermediate state with a deforming portion 501 (see FIG. 9B). FIG. 9A shows a front view of intermediate components 100' of the hook fastener 100 before the cap 101 is deformed and FIG. 9B shows a side view of the intermediate components 100'. Each of the intermediate components 100' includes a first protruding portion 201' which will be the stem 201 extending from the base and a second protruding portion 501 (also referred to as a deforming portion 501) having a width narrower than a width of the first protruding portion 201' in the machine direction (MD). In the cross machine direction (CD), the dimension of the first protruding portion 201' is approximately equal to the dimension of the second protruding portion 501. The intermediate component 100' may be molded. For example, synthetic resin may be melted, extruded using a die wheel, and then cooled to mold the intermediate component 100'. In some cases, the hook fastener 100 takes the shape shown in FIG. 9B before it passes between two rollers, as explained below. As shown in FIG. 9B, the deforming portion 501 may be tilted in a rear machine direction at an angle φ that is approximately 10°-15° from a center line 511 of the first protruding portion 201' extending in an approximately vertical direction. In addition, the first protruding portion 201' may include a center line 511 and the deforming portion 501 may include a deforming center line 512. In some cases, the tilt of the deforming portion 501 may affect the final thickness of cap 101 (e.g., see T₁ and T₂ in FIG. 4) and/or the contour of sloped surface 202. The first protruding portion 201' may include a pair of upper surfaces 207', which are on both sides of the deforming portion 501 in the machine direction. The upper surface 207' on the front machine side (e.g., left side in FIG. 9B) is longer than the upper surface 207' on the rear machine side (e.g., right side in FIG. 9B). In some cases, the length of the upper surfaces 207' of the first protruding portion 201' may affect the size of the cavity 107.

Figure 10:
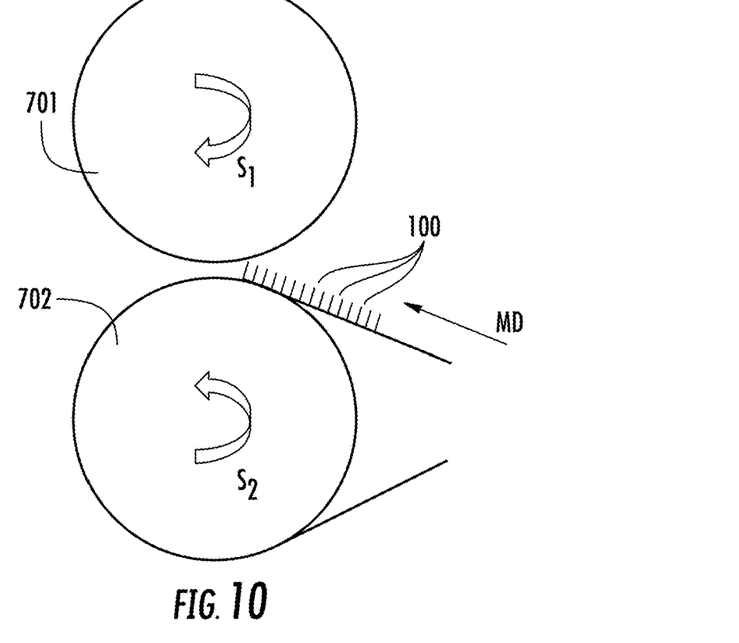
FIG. 10 is a schematic view of a manufacturing process for hook fasteners according to certain aspects.

As shown in FIG. 10, an exemplary process for manufacturing hook fasteners 100 may include two rollers 701 and 702, where, in a second step, the intermediate components 100' of the hook fasteners 100 pass between the two rollers such that the deforming portion 501 is deformed into the cap 101. The first protruding portion 201' is not substantially deformed and becomes the stem 201 directly. As described above, the cap 101 is formed when the intermediate components 100' of the hook fasteners 100 pass between the two rollers and the deforming portion 501 is deformed by the rollers. In some examples, one or both of the rollers are heated. In some cases, the first roller 701 is heated and has a first speed S₁ and the second roller 702 has a second speed S₂. The two speeds S₁, S₂ may be the same or may be different. In some cases, the first speed S₁ is greater than the second speed S₂. In some cases, the first speed S₁ is 5% to 25% greater than second speed S₂, although any suitable speed differential may be used.

Figure 12:
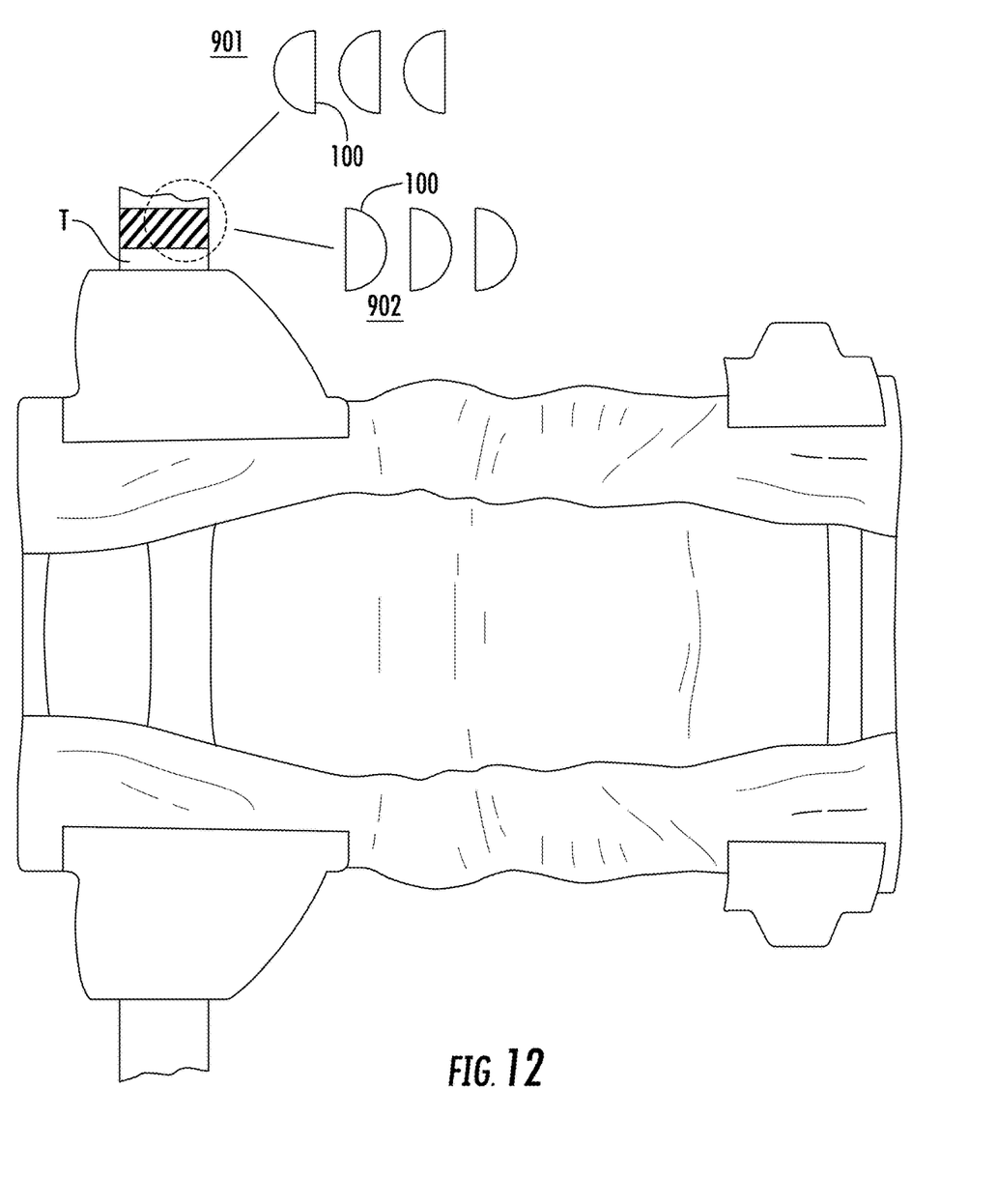
FIG. 12 is a top view of a diaper incorporating hook fasteners according to certain aspects.

FIG. 12 shows an example of a diaper incorporating one or more hook fasteners 100 on a tab of the diaper. For illustration purposes, FIG. 12 includes a representation of hook fasteners 100 that are drawn schematically and are not drawn to scale. In some cases, the hook fasteners 100 are arranged as shown in 901 while in other cases, the hook fasteners 100 are arranged as shown in 902. In FIG. 12, 901 shows an example where the first and second overhanging portions extend in a longitudinal direction of a tab T to which the hook fastener 100 is attached such that the first end is arranged at one side in a width direction of the tab T and the second end is arranged at opposite side to the one side. In FIG. 12, 902 shows an example where the first end and the second end are arranged opposite to the example of 901. The hook fasteners can be arranged in any suitable orientation, however, and are not limited those arrangements shown in FIG. 12. For example, the hook fastener structures 100 are arranged in a combination of the arrangements shown in 901 and 902. The hook fasteners also can be positioned on any suitable structure and are not limited to use with diapers and/or tabs on diapers.

The components of the hook fasteners 100 may be formed of materials including, but not limited to, non-woven polypropylene, other non-woven materials, woven materials, other plastic materials, thermoplastic, metallic materials, other composite materials, cotton, wool, synthetic fabric, or other similar materials.

Different arrangements of the components depicted in the drawings or described above, as well as components and steps not shown or described are possible. Similarly, some features and sub-combinations are useful and may be employed without reference to other features and sub-combinations. Cases of the invention have been described for illustrative and not restrictive purposes, and alternative cases will become apparent to readers of this patent. Accordingly, the present invention is not limited to the cases described above or depicted in the drawings, and various cases and modifications may be made without departing from the scope of the claims below.

That which is claimed is:

1. A method of manufacturing hook fasteners, the method comprising:
    forming intermediate components of a hook fastener using a die wheel;
    passing the intermediate components between a first roller and a second roller; and
    deforming deforming portions of the intermediate components to form caps, wherein each of the caps comprises:
        an upper surface, a first end, a second end, and at least one overhanging portion,
    wherein:
        the upper surface of each of the caps is sloped between the first end and the second end;
        the first and second ends are at opposite longitudinal ends of each of the caps; and
        the at least one overhanging portion extends in a lateral direction from each of the caps,
    wherein forming the intermediate components using the die wheel comprises molding the intermediate components such that longitudinal axes of the deforming portions of the intermediate components are tilted in an opposite direction to a machine direction at an angle that is approximately 10°-15° from a vertical axis, wherein forming the intermediate components using the die wheel comprises molding the intermediate components such that each of the intermediate components comprises:
  a first protruding portion extending from a base of the hook fastener; and
  a second protruding portion having a width narrower than a width of the first protruding portion in the machine direction,
  wherein the second protruding portions of the intermediate components are the deforming portions, and
wherein:
  the first protruding portion comprises a pair of upper surfaces on both sides of the second protruding portion in the machine direction; and
  one of the pair of upper surfaces of the first protruding portion at a front side in the machine direction is longer than the other of the pair of upper surfaces of the first protruding portion at a rear side in the machine direction.

2. The method of claim 1, further comprising heating the first roller.

3. The method of claim 1, further comprising spinning the first roller at a first speed and spinning the second roller at a second speed, wherein the first speed is 5% to 25% greater than the second speed.

4. The method of claim 1, wherein, in a cross machine direction that is perpendicular to the machine direction, a dimension of the first protruding portion is approximately equal to a dimension of the second protruding portion.

5. The method of claim 1, wherein forming the intermediate components comprises:
  melting synthetic resin;
  extruding the melted synthetic resin using the die wheel; and
  cooling the extruded synthetic resin to mold the intermediate components.

* * * * *

UNITED STATES PATENT AND TRADEMARK OFFICE
CERTIFICATE OF CORRECTION

PATENT NO. : 10,646,004 B2  
APPLICATION NO. : 15/990901  
DATED : May 12, 2020  
INVENTOR(S) : Satoshi Nakada et al.

Page 1 of 1

It is certified that error appears in the above-identified patent and that said Letters Patent is hereby corrected as shown below:

In the Specification

In Column 3, Line 67, delete "than) 90°." and insert -- than 90°). --, therefor.

In the Claims

In Column 8, Line 50, in Claim 1, delete "deforming deforming" and insert -- deforming --, therefor.

Signed and Sealed this  
Thirtieth Day of June, 2020

Andrei Iancu  
*Director of the United States Patent and Trademark Office*